US006173096B1

(12) United States Patent
Bagley et al.

(10) Patent No.: US 6,173,096 B1
(45) Date of Patent: Jan. 9, 2001

(54) SWITCHING TEMPORAL OPTICAL SOLITONS IN A PLANAR LIGHTGUIDE CIRCUIT

(75) Inventors: Brian G. Bagley, 16474 W. River Rd., Bowling Green, OH (US) 43402; Robert T. Deck, Toledo; Anca L. Sala, Sylvania, both of OH (US)

(73) Assignee: Brian G. Bagley, Bowling Green, OH (US)

( * ) Notice: Under 35 U.S.C. 154(b), the term of this patent shall be extended for 0 days.

(21) Appl. No.: 09/294,294

(22) Filed: Apr. 19, 1999

(51) Int. Cl.$^7$ ..................................................... G02B 6/26

(52) U.S. Cl. ............................... 385/50; 385/16; 385/24; 385/132; 385/48; 385/47

(58) Field of Search ................................. 385/50, 48, 49, 385/47, 42, 45, 16, 24, 15, 17, 122–128, 132

(56) References Cited

U.S. PATENT DOCUMENTS

| | | |
|---|---|---|
| 4,406,516 | 9/1983 | Hasegawa . |
| 4,558,921 | 12/1985 | Hasegawa et al. . |
| 4,856,860 | 8/1989 | Silberberg et al. . |
| 4,881,788 | 11/1989 | Doran . |
| 5,600,479 | 2/1997 | Evans ................................ 385/16 X |
| 5,651,079 | 7/1997 | Goorjian ................................ 385/16 |
| 5,717,797 | 2/1998 | Evans .................................... 385/27 |
| 5,878,181 * | 3/1999 | Van Der Tol ........................ 385/122 |
| 5,943,459 * | 8/1999 | Hildebrand et al. ................... 385/50 |
| 6,081,639 * | 6/2000 | Kagami et al. ..................... 385/50 X |

OTHER PUBLICATIONS

Dissatation—A. Sala Propagation—Switching of Light in Rectangular Waveguiding Structures, chapter 3 & 5, U. Toledo May 1998, Univ. Microfilms.

D. Marcuse, Light Transmission Optics, p. 326, 327; Van Nostrand.

F. Ladouceur—Silica–based Buried Channel Waveguide and Devices, 16, 17, 64, 65(1996), J. Love Chapman & HIll.

Sala, Mirkov, Deck & Bagley—Chromatic dispersion in rectangular geometry waveguides, p. 175–180 Opt. Eng. 38 Jan. 1999.

* cited by examiner

Primary Examiner—Phan T. H. Palmer
(74) Attorney, Agent, or Firm—B J Associates; Bolesh J. Skutnik

(57) ABSTRACT

A planar waveguide device is described which can function as either a switching or power dividing element of a soliton transmission communication system operating at a selected central wavelength. The device has one input and two outputs and consists of two optical channel waveguides, in a coupler-like configuration, each of whose cores has a refractive index and dielectric constant with a dependence on the optical signal intensity which can balance a negative dispersion in the waveguide at dimensions compatible with monomode transmission of the selected central wavelength. It is a property of such waveguides that if the input to one channel waveguide is a temporal optical soliton, the output will also be a temporal soliton, and the output waveguide, or waveguides, from which it exits the device as well as the power of the switched or power divided signal at each output will be dependent upon the input soliton peak power. Such switching and power dividing circuits are useful at the input and output of soliton transmitting fibers as part of a high bit-rate (broadband) communication system.

9 Claims, 4 Drawing Sheets

SWITCHING TEMPORAL OPTICAL SOLITONS IN A PLANAR LIGHTGUIDE CIRCUIT

BACKGROUND OF THE INVENTION

1. Field of the Invention

This invention pertains to components of a high bit-rate monomode optical communication system present in a digital transmission system. More specifically, it pertains to optical channel waveguides in planar lightguide circuits which can be used to switch or power divide temporal optical soliton signals between waveguides prior to their entrance to, or at the exit from, optical fibers.

2. Prior Art Statement

In a modern optical communication system there are two aspects which limit performance. The first of these is optical attenuation due to absorption or scattering by the transmission medium. Attenuation limits how far a signal can travel in an optical fiber transmission line before it requires amplification. The second aspect is signal pulse broadening due to dispersion, which limits the bit-rate, or bandwidth, because of a loss of detector discrimination between adjacent pulses in a communication bit stream.

The aim of the present invention is only digital signal systems in which the signal consists of the presence or absence of pulses within a pulse-bit stream. It is not concerned with analog systems in which the signal consists of a varying amplitude of an electromagnetic wave.

The current practice for long distance optical communication systems requires the use of "repeaters" which involve two optoelectronic conversions. Photons of an optical signal travelling in the optical fiber are converted, through use of a photodetector, to an electric signal, i.e. electrons. The signal is electrically amplified to correct for absorption and electrically reshaped to correct for dispersion and the resulting signal converted back to photons, e.g. through use of a diode laser, for transmission through the next optical fiber link.

Recently, however, erbium doped optical amplifiers have been implemented into some fiber optic transmission systems. This innovation has the marked advantage that amplification, to correct for attenuation losses in long distance systems, occurs without the need to convert to electrons. The second problem, signal dispersion, is not addressed by these optical amplifiers.

Clearly there is considerable technological, as well as commercial, advantage in eliminating the periodic repeaters still required in an optically amplified fiber optic communication system to reshape signals which have broadened through dispersion. Long distance or high bit-rate digital communication applications would benefit from an optical system in which no signal pulse broadening due to dispersion occurs.

Dispersion, which leads to pulse broadening, has two components. The first is material dispersion which is a bulk property of the waveguide material system and its composition. The second is termed waveguide dispersion. It is a function of the waveguide's geometry, its dimensions and the profile of the material composition within the waveguide. Taken together the two components are generally termed chromatic dispersion.

To transmit signals over long distances or for high bit-rate transmission, in general, it is necessary that a pulse does not change shape with time. This in turn requires that there be a way to compensate for the naturally occurring pulse broadening due to chromatic dispersion within the optical transmission system.

Hasegawa, U.S. Pat. No. 4,406,516, discloses that a solution to this dispersion problem lies in a fiberguide communication system that propagates temporal optical solitons as the digital signal. A temporal optical soliton occurs when the pulse broadening due to chromatic dispersion is balanced by the contraction due to a nonlinear dependence of the transmission medium's index of refraction on light intensity. In '516 the conditions necessary to achieve a fiberguide communication system which can propagate temporal optical soliton pulses are disclosed. Hasegawa and Kodama, U.S. Pat. No. 4,558,921, disclose a repeaterless optical fiber communication system in which soliton pulse attenuation is non-electronically amplified by appropriate amounts at appropriate intervals. All of this prior art concerns fiberguides (round optical waveguides or optical fibers). Indeed, the design of the fiber aspects of a communication system has reached a high level of sophistication (Hasegawa and Kodama, *Solitons in Optical Communications*, Clarendon Press (1995)).

Inputting, and often outputting too, of digital signals to and from optical fiber transmission lines generally requires that the signals be processed in some way. Examples of signal processing include signal switching from one waveguide to another, power splitting of the signal, adding a signal to an existing bit stream or extracting a desired signal from an existing bit stream. Optical circuits which serve these processing functions are best fabricated in planar configurations using standard fabrication procedures and techniques developed for the processing of modern electronic integrated circuits. These optical circuits, generally termed planar lightguide circuits, have as a fundamental element a channel waveguide whose function is to transmit (propagate) the optical signal throughout the circuit. It is a consequence of the fabrication procedure that a channel waveguide will have a rectangular (or square) cross section. The prior art has dealt with waveguides having circular cross sections but not rectangular ones. Soliton propagation, being strongly dependent on the geometry of the waveguide, cannot be predicted for channel waveguides by following the criteria set forth for optical fibers.

Furthermore, because the digital signals are confined within a waveguide having two small dimensions and one large dimension, inventions based on spatial solitons have no bearing on the problems of soliton transmission through such waveguides. Temporal solitons are the vehicle for transmitting digital signals without pulse broadening, because they do not change their shape while propagating with time. Spatial solitons, in contrast, employ nonlinearity in optical properties to stabilize a beam shape spatially in a medium with three large, or at least two large, dimensions.

The fabrication of channel waveguides which will propagate temporal optical solitons has been disclosed in a companion application by the inventors, Bagley et al. in U.S. Ser. No. 09/169859, which is included herein by reference.

Two of the important processing functions in an optical communication system are switching a signal from one waveguide to another and power dividing an input signal to two output waveguides. These processes can be done electrically, for example, by converting the input photons to electrons through use of a photo detector and then electrically switching, or power dividing, the electronic signal to the desired output or outputs. In this case the signal must be converted back to photons, e.g. through use of a diode laser, for transmission through the next optical fiber link. An all-optical (all-photonic) device has the advantage that the photons need not be converted to electrons and then back to photons, as a result of which an all-optical device will, in general, be faster and less complex than an electrical switch (or power divider) for optical signals.

Silberberg and Smith, U.S. Pat. No. 4,856,860, disclose an all-optical switch which is appropriate for spatial solitons but not temporal solitons.

Goorjian, U.S. Pat. No. 5,651,079, discloses an optical switch which uses a medium that supports combined temporal and spatial solitons (light bullets) and requires a counter-propagating light bullet to switch the input light bullet signal.

Evans, U.S. Pat. No. 5,600,479, discloses a fiberguide based soliton switch in which the switched signal has a shifted central frequency. Evans, U.S. Pat. No. 5,717,797 also discloses a fiberguide based nonlinear optical loop mirror in which the unswitched signal is reflected back into the input.

Doran, U.S. Pat. No. 4,881,788, discloses a fiberguide based device requiring one splitter and one coupler in which switching is effected by means of an irtensity dependent phase difference between two parts of a divided input signal.

The problem presented in achieving a commercially and technically successful digital optical communication system for long distance communication or high bit-rate transmission is: to design not only optical fibers with necessary dimensions and optical properties and signal power to propagate temporal solitons, i.e. sustain temporal soliton transmission, but also to provide planar lightguide circuits containing channel waveguides which can propagate, switch (from one waveguide to another) and power divide (between waveguides) temporal optical solitons and which are compatible with optical fiber transmission lines. The present invention provides a solution to these latter problems.

OBJECTS AND SUMMARY OF THE INVENTION

It is the object of this invention to provide a planar lightguide circuit having one input and two output optical channel waveguides suitable for the switching or power dividing of temporal optical solitons in digital communication systems.

Briefly stated, the present invention provides a planar waveguide device which can function as either a switching or power dividing element in a soliton transmission communication system operating at a selected central wavelength. The device has one input and two outputs and consists of two optical channel waveguides, in a coupler-like configuration, each of whose cores has a refractive index and dielectric constant with a dependence on the optical signal intensity which can balance a negative dispersion in the waveguide at dimensions compatible with monomode transmission of the selected central wavelength. It is a property of such waveguides that if the input to one channel waveguide is a temporal optical soliton, the output will also be a temporal soliton, and the output waveguide, or waveguides, from which it exits the device as well as the power of the switched or power divided signal at each output will be dependent upon the input soliton peak power. Such switching and power dividing circuits are useful at the input and output of soliton transmitting fibers as part of a high bit-rate (broadband) communication system.

The above and other objects, features and advantages of the present invention will become apparent from the following description read in conjunction with the accompanying drawings, where elements having the same identification number represent the same element in different figures.

DETAILED DESCRIPTION OF PREFERRED EMBODIMENTS

In the present invention, planar lightguide circuits having two optical channel waveguides with rectangular cross-sections are described. These waveguides have the property that they can propagate, switch and power divide temporal optical solitons. A planar lightguide circuit, also known as an optical integrated circuit or silicon optical bench (when silicon is the substrate), which has such propagating, switching and signal dividing elements is useful for signal processing.

Figure 1:
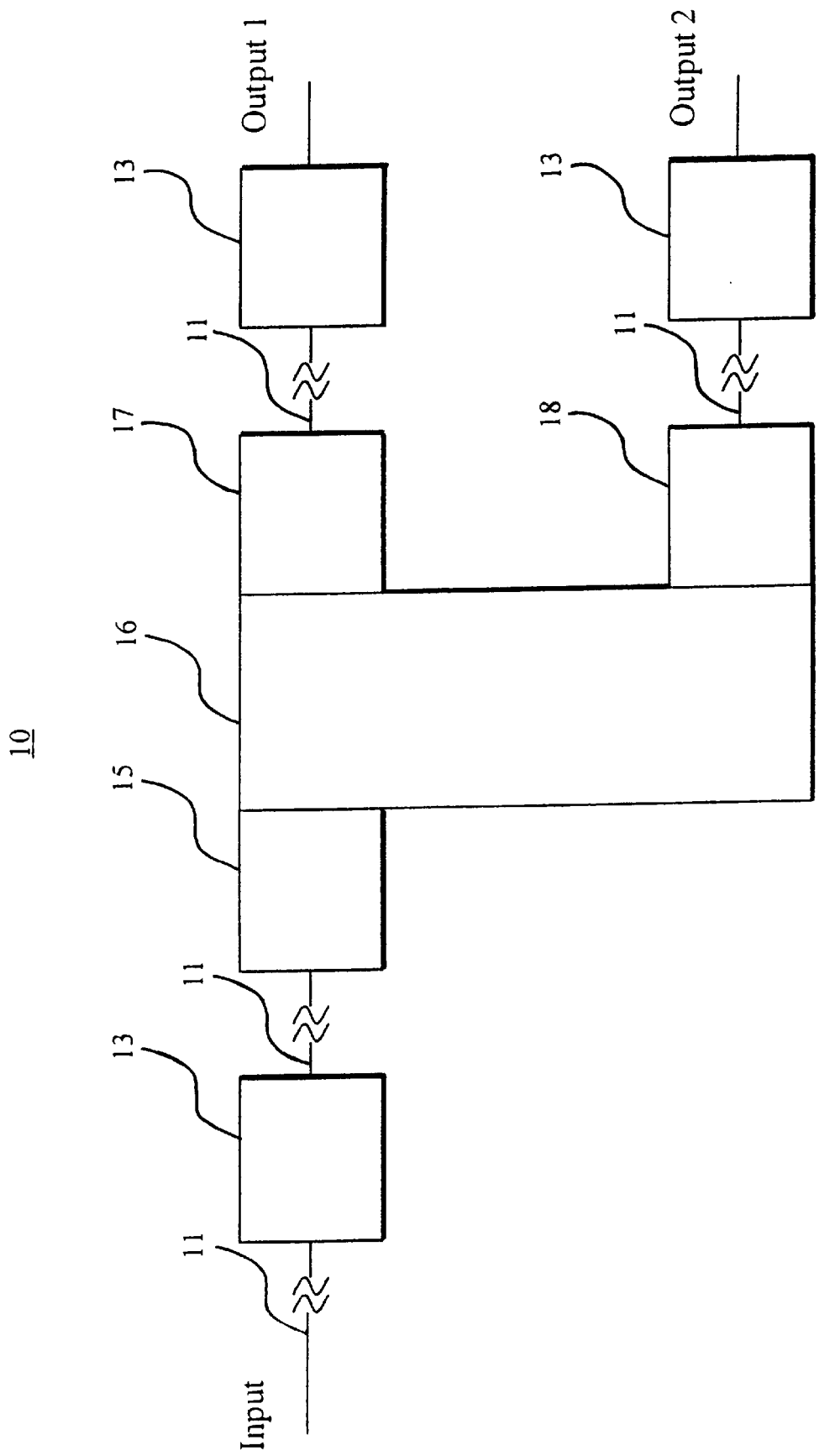
FIG. 1 schematically shows an exemplary optical communication system for the practice of the invention.

A section of an optical communication system including embodiments of the present invention is depicted in FIG. 1. Planar lightguide circuits can serve these switching and signal dividing functions at 16 in a high bit-rate (i.e. broadband) optical communication system, including optical fiber 11, optical amplifier 13, optical amplifier having a variable and definable amplification factor 15, output 1 attenuator 17, output 2 attenuator 18. Because of the technological advantages of erbium doped optical amplifiers and the low absorption loss of silica and silica-based materials, the preferred signal wavelength is in the range, 1.55±0.06 $\mu$m. The invention, however, is not limited to this wavelength range.

Figure 2:
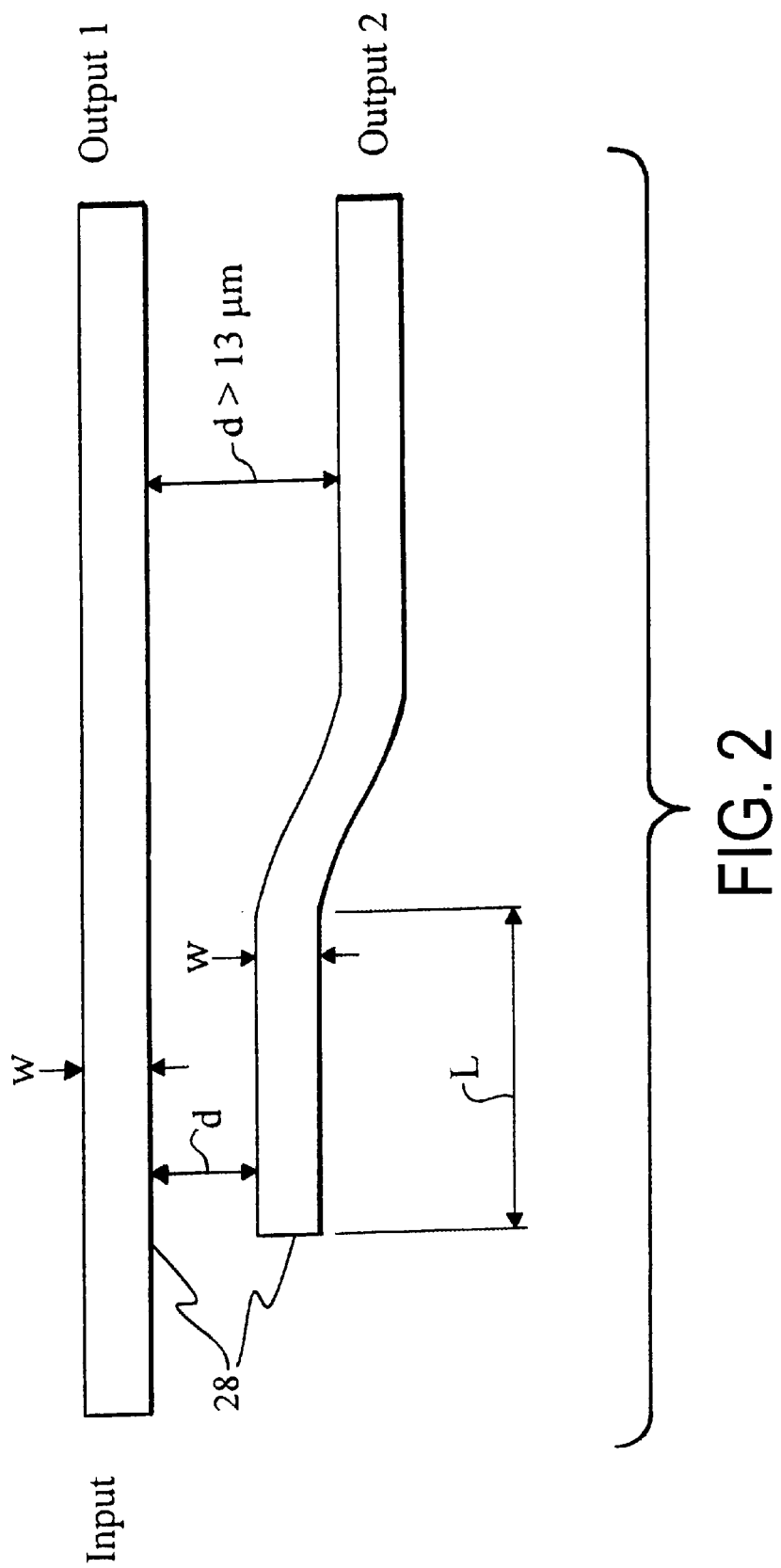
FIG. 2 is a plan view representation of the temporal soliton optical switch/power divider of the present invention.
Figure 3:
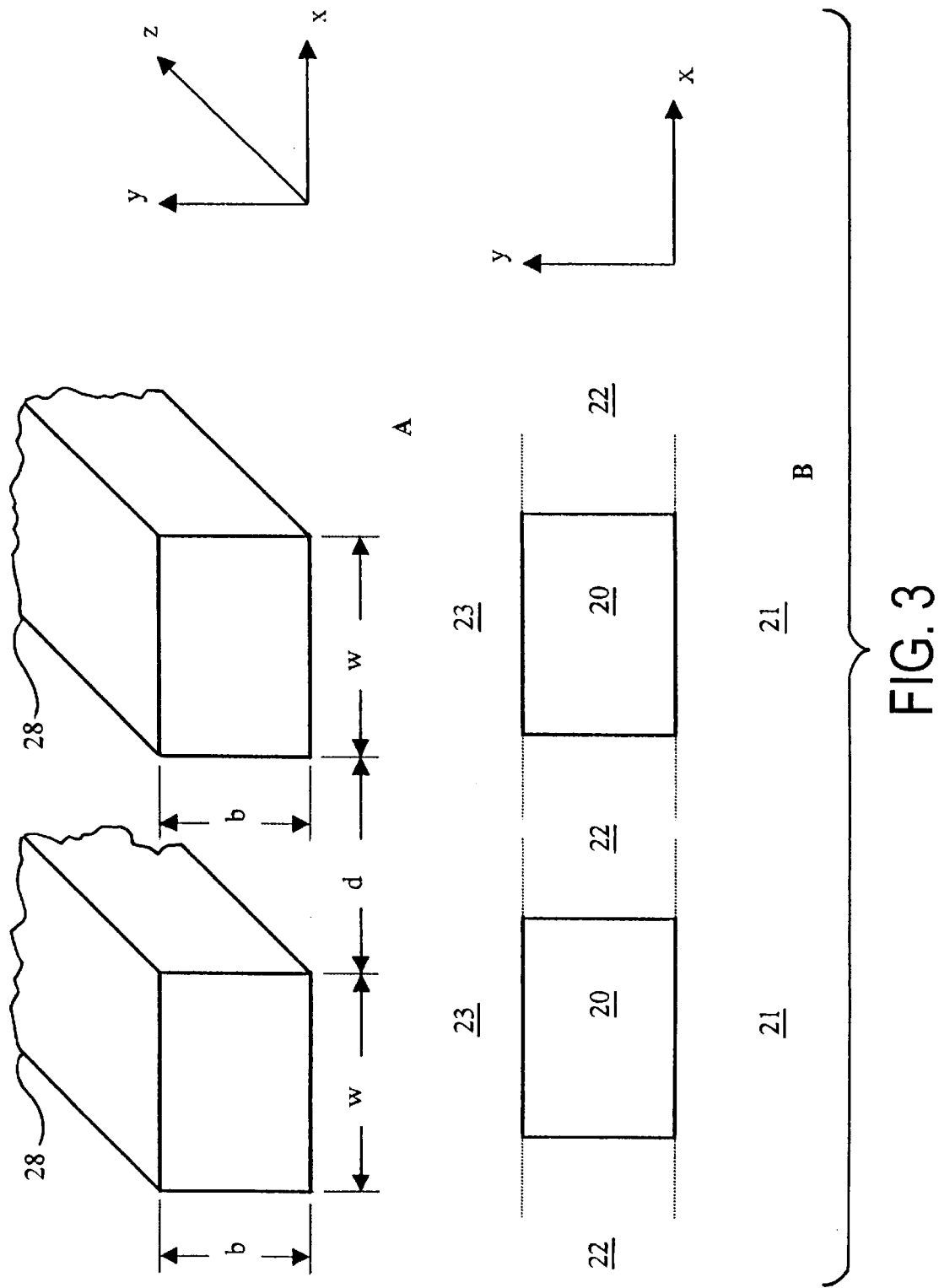
FIG. 3 is a representation of the two optical channel waveguides, central to the practice of the invention, having rectangular cross-sections and whose long axis has a planar geometry. The upper figure, A, is a three-dimensional representation and the lower figure, B, is a cross-section.

Central to the invention are two planar optical channel waveguides, 28, in FIG. 2 (plan view) and in FIG. 3A, in line with optical fibers 11 of FIG. 1 comprising a majority of optical transmission line 10 within a communication system. As depicted in FIG. 3B, optical channel waveguide 28 consists of core 20 within which a major portion of an optical signal power is transmitted, and cladding 21/22/23 which confines an optical signal to core 20. A consequence of current optical fiber manufacture is that a fiber waveguide core in an optical fiber has a cylindrical geometry. On the other hand, a consequence of the fabrication of a planar lightguide circuit, using standard lithographic techniques and an anisotropic etching process (e.g. ion milling), is that a planar waveguide core in a signal processing element will have a rectangular geometry as depicted in FIG. 3. The waveguides of interest in the present invention, generally termed channel waveguides, have one long dimension along the propagation direction and two small transverse dimensions. Key to the present invention is that the conditions necessary for switching and power dividing, as well as propagating, of a temporal soliton in an optical waveguide are geometry dependent.

In a planar lightguide circuit, the optical waveguides (lightguides), which can be straight or curved, are fabricated on the major surface of a supporting substrate. The substrate plays the role of a mechanical support for the otherwise fragile lightguide circuit and it can, if desired, also play the role of cladding 21. In addition, it can play the role of a fixture to which input and output fibers are attached so as to optically couple cores of an input/output fiber to the cores of the planar lightguide circuit.

It is a consequence of standard lithographic and etching procedures that the cross-section of the waveguide will be rectangular (or square) and it is a consequence of the fabrication procedure that the lightguide circuit, consisting of one or more optical waveguides (straight or curved), will be planar and lie parallel to the substrate major surface.

Electromagnetic signals can propagate in the form of solitons only in a material medium in which the total (chromatic) dispersion is balanced by a nonlinear polarization. In the case of the silica-based materials of concern in the present invention, this nonlinear polarization has a form consistent with a Kerr-type nonlinear index of refraction, given by $n=n_o+n_2I$, where I is the intensity of the field in the medium, $n_o$ is the linear index of refraction and $n_2$ is the "Kerr" nonlinear index of refraction. Therefore, detailed determination of the choice of materials for the core and cladding, the waveguides dimensions, and the minimum power requires a solution of Maxwell's equations in the presence of a "Kerr" nonlinear polarization. These equations lead to coupled Nonlinear Schroedinger Equations for the time-dependent amplitudes of the electromagnetic fields in the two waveguides of the present invention. The detailed method of solution of these equations for planar waveguides having rectangular (or square) cross-sections is contained in Chapters 3 and 5 of the Ph.D. thesis by Sala (*Propagation and switching of light in rectangular waveguiding structures*, The University of Toledo, 1998, AAT 9829260, UMI, Ann Arbor, Mich.) which is incorporated herein by reference.

Under the condition that both the dispersion and the nonlinearity are weak or the input power into the device is low, so that the coupling is effectively linear, the derived solutions of the equations predict a complete transfer of a signal field from one waveguide of the device to the other waveguide in the coupling distance L, given by:

$$L=\pi/(k_1-k_2),$$

where $k_1$ and $k_2$ represent the propagation constants of the lowest order symmetric and anti-symmetric modes of the two channel structure at the central wavelength of the signal, $\lambda_c$. In contrast, at higher values of the input power, the change in the index of refraction of the input channel produced by its nonlinear dependence on the field intensity results in a retention of the input power in the channel in which it entered the device, In the device of the present invention, if only a portion of the input signal is switched then the device acts as a signal power divider.

There are a number of guidelines for the practice of this invention. First, it is required that the two waveguides have the same propagation constant β. The preferred embodiment, as being the most easily manufactured, is to have both waveguides of the same dimensions and the same core/cladding compositions. It is also required that the two waveguides be close enough to interact via the evanescent field of the temporal optical soliton signal. Preferred embodiment is to have waveguides which are parallel for a length L (defining the device length), after which a fan-out of one or both of the waveguides prevents their further interaction, for example as depicted in FIG. 2.

To act as an optical waveguide, the material of choice fir the core and cladding of each waveguide must have low absorption loss (i.e. be highly transparent) at the communications wavelength of interest. The current use of erbium doped optical amplifiers for signal amplification dictates that the signal wavelength be in the range, 1.55±0.06 μm. Low absorption loss at this wavelength dictates that the material systems of interest are silica and silica-based alloys. Under different conditions the materials might be based on another material system.

The next requirement is that the refractive index of the core be greater than that of the cladding, such that the major portion of the signal power be confined and propagate in the core, while a small portion of the signal power, the evanescent field, propagates in the cladding.

These two latter requirements are the basic requirements for the fabrication of an optical waveguide. However, there are additional constraints on waveguides which can propagate temporal optical solitons. In the case of the materials considered here, having positive nonlinear indices of refraction, the first of these constraints is that the dispersion coefficient, β", defined as the second derivative of the propagation vector of the guided light with respect to its angular frequency, ω, must have a negative value. Under this condition, if the input to the waveguide is a soliton, the output will be a soliton for any negative β" subject to a signal power constraint discussed later. On the other hand, if the planar lightguide circuit is to play a more active role, such as in soliton switching, then the dispersion length of the optical soliton should be as short as possible to avoid a need for excessively large planar substrates. Because the reciprocal of the magnitude of β" determines the dispersion length of a temporal soliton, large (negative) values of β" allow temporal solitons to be switched in short distances within an optical circuit, and maximally large negative values of β" are therefore made preferable. In an optical circuit designed in this invention, values of β" more negative than $-20$ ps$^2$/km are preferred. Here the magnitude of β" depends upon the optical properties (dielectric constants) of the core, the optical properties of the cladding, and the dimensions of the core (Bagley et al., U.S. Ser. No. 09/169859). There are, however, a number of guidelines which, in general, will yield a large negative value of β". They are: (i) the core material must be nonlinear and dispersive having a linear index of refraction, $n_o$, in the range between 1.3 and 2.0; (ii) the nonlinear index of refraction, $n_2$, should lie in the range $(1-100)\times10^{-16}$ cm$^2$/W, and the nonlinearity must have a fast response time, $10^{-15}-10^{-14}$ sec. (in order that the nonlinear response be effectively instantaneous compared to the time duration of the signal pulse); (iii) the central wavelength of the signal, $\lambda_c$ (e.g. 1.55 μm), must fall in the anomalous dispersion region of the material, and must coincide with a large negative value for the material dispersion. Given that the wavelength corresponding to zero dispersion in the material is denoted by $\lambda_o$, it is necessary that $\lambda_o<\lambda_c$. The dispersive characteristics of a material can generally be described by the Sellmeier formula with 3 (or sometimes 5) terms in the sum. This formula has the form $$\varepsilon(\lambda) = 1 + \sum_{i=1}^{3} \frac{A_i \lambda^2}{(\lambda^2 - \lambda_i^2)}$$

where $A_i$ and $\lambda_i$ represent fitting parameters characteristic of a given material medium. If the dispersive properties of a given material are expressed by way of a three term Sellmeier relation with $\lambda_1 < \lambda_2 < \lambda_3$, a high negative value of the dispersion at $\lambda = \lambda_c$ can generally be obtained if $\lambda_3 > \lambda_c$ but close to $\lambda_c$.

The design requirements for the cladding material are less stringent than those for the core. The cladding material can be optically linear and non-dispersive, but it is preferred that it have dispersive properties similar to those of the core, and it can also be optically nonlinear, as is the core.

To ensure that the core is an appropriate optical waveguide, a restriction on the linear index of refraction, $n_o$, of the cladding follows from the requirements on the quantity $\Delta = (\in_1 - \in_2)/2\in_1$, where $\in_1$ is the dielectric constant of the core and $\in_2$ is the dielectric constant of the cladding. For materials with low absorption loss at a particular wavelength of interest, as is the case in the present invention, the linear dielectric constant at a given wavelength equals $n_o^2$. For practice of this invention the requirement is that $0.003 \leq \Delta \leq 0.02$, with the lower values of $\Delta$ (from 0.003 to 0.01) being preferred.

The description thus far is appropriate for an optical waveguide which can support the propagation of temporal optical solitons in both monomode and multimode regions. If the description has been complied with thus far, then often there is a well-defined and rather narrow window in the cross-sectional dimensions appropriate for the application of this invention. This window, when it occurs, is defined at small dimensions by $\beta''$ becoming positive, and at larger dimensions by a violation of the monomode condition. Use of the slab approximation along each dimension of a square waveguide produces an approximate form for the condition on the dimensions of a square waveguide required for monomode propagation expressible as (D. Marcuse, *Light Transmission Optics*, p.326–27, Van Nostrand Reinhold Co. (1995)):

$$w = b \leq \frac{1}{2} \frac{(\lambda_c - \Delta \lambda)}{\sqrt{\varepsilon_1 - \varepsilon_2}} \quad \text{(a)}$$

where $\Delta\lambda$ is the bandwidth of the signal at the central wavelength $\lambda_c$, w and b represent the width and breadth of the traverse dimensions as illustrated in FIG. 3 and the other parameters were defined above. In contrast, an alternative analysis (F. Ladouceur and J. D. Love, *Silica-based Buried Channel Waveguides and Devices*, p16–7, 64–5, Chapman & Hall (1996)), which accounts for the coupling between the simultaneous constraints of the guide's two transverse dimensions, provides a (less restrictive) condition on the dimensions expressible as:

$$w = b \leq \frac{2.13}{\pi} \frac{(\lambda_c - \Delta \lambda)}{\sqrt{\varepsilon_1 - \varepsilon_2}} \quad \text{(b)}$$

Here it is sufficient to emphasize only the existence of conditions on the dimensions of the waveguide for monomode propagation; these conditions being approximated by the two inequalities given above. Whereas, the preferred geometry of the waveguide cross-section is square, the equality between w and b need not be accurate and, more generally, soliton propagation will occur when the ratio b/w has values in the rang from 0.5 to 2.

At this point, a waveguide which has the ability to propagate fundamental temporal optical solitons has been characterized. But whether or not a particular communications signal will propagate as a soliton is dependent on the satisfaction of one additional relationship expressible in the form $(2\pi/\lambda_c)P_o T_o^2 = -\beta'' A_{\text{eff}}/n_2$ where $P_o$ is the peak power in the signal pulse, $T_o$ is the duration of the signal pulse and $A_{\text{eff}}$ is the effective area and the other parameters as previously defined. Moreover, in order that the device be capable of switching a soliton as a soliton it is necessary that the dispersion must compensate for the nonlinearity within the coupling length of the device. For this purpose the dispersion length, $L_D$, must be well matched to the nonlinear length, $L_{NL}$ of the waveguide channels and be comparable to, or less than, the linear coupling distance, L, as the latter is illustrated in FIG. 3. Here the dispersion length and the nonlinear length of a waveguide channel are defined by the equations:

$$L_D = T_o^2/|\beta''|$$
$$L_{NL} = \lambda_c A_{\text{eff}}/(2\pi n_2 P_o)$$

respectively.

For the practice of the present invention it may be required that he peak power of the input signal of FIG. 2 be changeable at the input so as to achieve the desired output 1 and output 2. This can be achieved by having at the device input an erbium doped optical amplifier whose optical pumping source intensity can be changed so as to change the degree of amplification. For example, if the optical pumping source is a diode laser the optical pumping intensity can be changed by changing the diode current and/or voltage, or by attenuating the diode laser light output. For some applications this feature may not be required. For example, in a switching system, the routing protocol through a series of switches may not require that every switch have a changeable peak power signal input. This is required only for those switches for which the routing choice is a variable.

In the practice of the present invention there may be applications where the signal power from output 1 and/or output 2 must be attenuated, as shown in the general schematic of the system in FIG. 1. In general, the two attenuators, 17/18, will provide different degrees of attenuation as they serve different functions. The main function of attenuator 17 at output 1 is to reduce the signal peak power to that of a fundamental temporal soliton (the most desirable soliton for long distance high bandwidth communication) prior to its insertion or re-insertion into the fiber transmission line. The main function of attenuator 18 at output 2 is to reduce the unwanted, residual, signal power to a level such that it cannot propagate as a temporal soliton or to a level at which it can be discriminated against and ignored. The preferred embodiment of these attenuators is a waveguide, either channel or fiber, which will support the propagation of temporal optical solitons and in which the core has been intentionally doped to increase the absorption at $\lambda_c$. In a particular system not all devices of the present invention will require attenuators on their outputs. Moreover, under certain conditions, a device which functions as a signal power divider may not require attenuators at either output.

EXAMPLE

Figure 4:
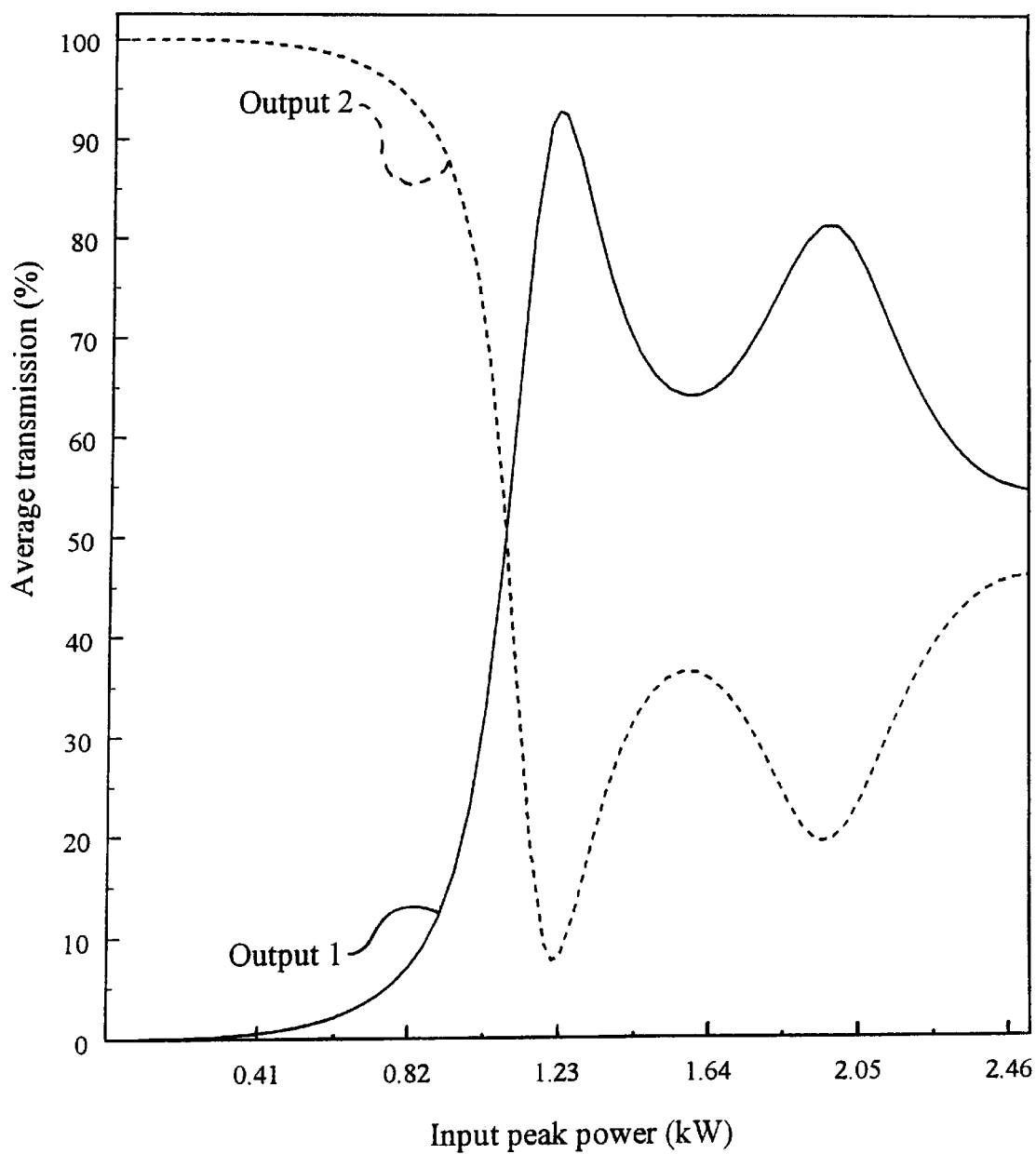
FIG. 4 is a graph of soliton power at output 1 (shown solid) and output 2 (shown dashed) as a function of soliton peak power at the input for two parallel square waveguides 71.8 cm long, whose cores are a phosphosilicate glass, and whose claddings are a borosilicate glass, and whose separation is 10.5 $\mu$m.

An example device consistent with the requirements of this invention can be formed from two square waveguides whose core material in each is an amorphous solid phosphosilicate of composition 9.1 mole % $P_2O_5$ and 90.9 mole % $SiO_2$. This material has bulk optical parameters; $n_o$=1.4589, $\lambda_o$=1.274 µm and $n_2$=3×10$^{-16}$ cm²/W. The cladding material for each waveguide is an amorphous solid borosilicate of composition 13.3 mole % $B_2O_3$ and 86.7 mole % $SiO_2$, having the optical parameters; $n_o$=1.4386, $\lambda_o$=1.231 µm and $n_2$=3×10$^{-16}$ cm²/W. For this core-cladding combination the relative index difference $\Delta$, is 0.014. For a square waveguide of dimensions b=w=4.2 µm, $\beta''$ has the value –32 (ps)²/km at the wavelength $\lambda_c$ of 1.55 µm, and the effective area, $A_{eff}$, is 20 µm². A fundamental temporal optical soliton signal pulse with duration 100 femtoseconds (FWHM equal to 176 fsec), centered at $\lambda_c$=1.55 µm, propagating through one such waveguide, will have a peak power of 410 W (the fundamental soliton power $P_0$). For two such parallel waveguides (one having an input and both having outputs) separated by a distance, d, of 10.5 µm and having coupling length, L, of 71.8 cm, the switching curves derived from the above analysis are shown in FIG. 4. Specifically, outputs 1 and 2 in the figure represent the percentage of the power which exits from that output as a function of the input peak power. A temporal soliton signal input to the switch having a width of 100 fsec and a peak power of 410 Watts, (0.41 kW) will exit at output 2 (the parallel waveguide) with a peak power of 410 Watts, whereas a temporal soliton input to the switch having a peak power of 1230 Watts (1.23 kW) will exit at output 1, the same waveguide as it entered, with an average power of 1132 Watts. As an example of this same device functioning as a signal divider, a temporal soliton input to the device having a peak power of 1070 Watts will be power divided and both outputs will be temporal solitons each having a power of 535 Watts.

Having described preferred embodiments of the invention with reference to the accompanying drawings. It is to be understood that the invention is not limited to the precise embodiments, and that various changes and modifications may be effected herein by those skilled in the art without departing from the scope or spirit of the invention as defined in the appended claims.

What is claimed is:

1. Planar waveguide devices which function as switching and signal power dividing elements of a soliton transmission communication system operating at a central wavelength, $\lambda_c$, comprising:

two optical channel waveguides within a planar lightguide circuit, one of said channel waveguides having both an input and an output and the other having only an output;

each of said two optical channel waveguides having a core and a cladding;

wherein each optical channel waveguide core has dimensions; b and w, and said core and cladding have optical parameters; linear and nonlinear refractive indices such that said channel waveguides can propagate temporal optical solitons through said communication system;

wherein each of said two optical channel waveguides, in isolation and at low power, will each propagate only a single waveguide mode having the same propagation constant $\beta$; and wherein said two optical channel waveguides have a separation between the two optical channel waveguides such that there will be a transfer of optical signal power from one waveguide to the other for a predicted input transmission power level.

2. Planar waveguide devices according to claim 1, wherein the temporal soliton peak power at the input lies in the range 0.5 to 3.5 $P_0$;

said $P_0$ being determined by the relationship $(2\pi/\lambda_c) P_o T_o^2 = -\beta'' A_{eff}/n_2$ wherein $P_o$ is the peak power in a fundamental soliton signal pulse, $T_o$ is the duration of the signal pulse (full width at half maximum equals 1.76 $T_0$), $\beta''$ is the dispersion coefficient at wavelength $\lambda_c$, $A_{eff}$ is the effective area and $n_2$ is the nonlinear Kerr coefficient.

3. Planar waveguide devices according to claim 1, wherein the temporal soliton peak power at the input can be changed by changing the optical power of the pumping source of an erbium doped optical amplifier.

4. Planar waveguide devices according to claim 1, wherein the temporal soliton peak power at least one output can be attenuated by propagating the temporal soliton in an optical waveguide, either channel or fiber, for which the core material is partially absorbing at the central wavelength $\lambda_c$.

5. Planar waveguide devices according to claim 1, wherein said dispersion coefficient, $\beta''$, has a large negative value, preferably more negative than –20 (ps)²/km.

6. Planar waveguide devices according to claim 1, wherein said two optical channel waveguides are separated by a distance of between 8 µm and 13 µm.

7. Planar waveguide devices according to claim 1, wherein said two optical channel waveguides' dimensions of b and w, independently follow an inequality given as:

$$b, w < (2.13/\pi)\{(\lambda_c - \Delta\lambda)/(\in_1 - \in_2)^{0.5}\}$$

wherein $\Delta\lambda$ is defined as the bandwidth of a signal at said central wavelength $\lambda_c$, $\in_1$ is the dielectric constant of said core and $\in_2$ is the dielectric constant of said cladding.

8. Planar waveguide devices according to claim 7 wherein a ratio of said channel waveguides' dimensions, b/w, is between 0.5 and 2.0.

9. Planar waveguide devices according to claim 1, wherein said two optical channel waveguides are parallel to one another, and are separated by a distance, d, equal to 10.5 µm, over a coupling length, L, equal to 71.8 cm, and said devices operate at a central wavelength of 1.55 µm; each said channel waveguide has dimensions, b=w=4.2 µm; said core has a composition of 9.1 mole % $P_2O_5$ and 90.9 mole % $SiO_2$; and said cladding has a composition of 13.3 mole % $B_2O_3$ and 86.7 mole % $SiO_2$.

* * * * *